US010310658B2

(12) United States Patent
Hou

(10) Patent No.: US 10,310,658 B2
(45) Date of Patent: Jun. 4, 2019

(54) TOUCH STRUCTURES WITH CLOSABLE ELECTRODES, TOUCH DISPLAY PANELS AND TOUCH DISPLAY DEVICES INCLUDING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventor: Qingna Hou, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 122 days.

(21) Appl. No.: 14/906,455

(22) PCT Filed: Jul. 20, 2015

(86) PCT No.: PCT/CN2015/084435
§ 371 (c)(1),
(2) Date: Jan. 20, 2016

(87) PCT Pub. No.: WO2016/112672
PCT Pub. Date: Jul. 21, 2016

(65) Prior Publication Data

US 2016/0370924 A1 Dec. 22, 2016

(30) Foreign Application Priority Data

Jan. 14, 2015 (CN) .......................... 2015 1 0019272

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
None
See application file for complete search history.

(56) References Cited

U.S. PATENT DOCUMENTS

2002/0134918 A1* 9/2002 Miida .................... H04N 5/361 250/214.1
2010/0019579 A1* 1/2010 Amerom ................ G06F 1/263 307/82

(Continued)

FOREIGN PATENT DOCUMENTS

CN 103197819 7/2013
CN 203149513 8/2013

(Continued)

OTHER PUBLICATIONS

English translation of WO2013/069290 also referred to as JP2012007182.*

(Continued)

*Primary Examiner* — Amr A Awad
*Assistant Examiner* — Donna V Lui
(74) *Attorney, Agent, or Firm* — Harness, Dickey & Pierce, P.L.C.

(57) ABSTRACT

A touch structure, touch display panel and touch display device are disclosed. The touch structure comprises multiple first electrodes and multiple second electrodes arranged to intersect with and insulate from the first electrodes. The first and second electrodes are connected with respective signal transmission lines which transmits a touch signal to the corresponding first or second electrode. At least one electrode in a set of the first and second electrodes is a closable electrode, at least a part of which is a closable part. A switch unit is arranged between the closable part and the corresponding signal transmission line to control connection and disconnection therebetween. With the present invention, by arranging the switch unit between the closable part and the (Continued)

corresponding signal transmission line to control the connection and disconnection therebetween, the touch function in the region corresponding to the closable part can be enabled or disabled.

16 Claims, 4 Drawing Sheets

(56) References Cited

U.S. PATENT DOCUMENTS

| | | | | |
|---|---|---|---|---|
| 2012/0120006 | A1* | 5/2012 | Liu | G06F 3/044 345/173 |
| 2014/0204035 | A1* | 7/2014 | Chang | G06F 3/0416 345/173 |
| 2015/0205428 | A1* | 7/2015 | Wang | G06F 3/044 345/174 |

FOREIGN PATENT DOCUMENTS

| | | |
|---|---|---|
| CN | 103309534 | 9/2013 |
| CN | 103472966 | 12/2013 |
| CN | 103677412 | 3/2014 |
| CN | 104503627 | 4/2015 |
| WO | 2013/069290 | 5/2013 |

OTHER PUBLICATIONS

Written Opinion of the International Searching Authority from corresponding PCT Application No. PCT/CN2015/084435, dated Oct. 9, 2015 (4 pages).

Office action from corresponding Chinese Patent Application No. 201510019272.0.; dated Jun. 8, 2016; 4 pages.

English translation of the Office action from corresponding Chinese Patent Application No. 201510019272.0.; dated Jun. 8, 2016; 5 pages.

* cited by examiner

TOUCH STRUCTURES WITH CLOSABLE ELECTRODES, TOUCH DISPLAY PANELS AND TOUCH DISPLAY DEVICES INCLUDING THE SAME

TECHNICAL FIELD

The present invention relates to display technology, and in particular, to a touch structure, a touch display panel and a touch display device.

BACKGROUND

With the rapid development of portable devices, electronic devices having a touch function, such as mobile phone, Pad or the like, have been widely used, so good user experience has becomes particularly important. Currently, multipoint touch control has become popular, which may easily cause problems such as misoperations by users, while meeting the demand for multipoint touch by users. For example, the existing electronic devices such as mobile phone, Pad have almost no keyboard and have comparatively narrow frames, so it is almost inevitable for a user to touch the surface of the touch panel when holding such a device, thus causing the misoperations which will reduce a user's experience feeling accordingly.

SUMMARY

Embodiments of the present invention provide a touch structure, a touch display panel and a touch display device, which can selectively enable or disable touch function in partial or whole region of the touch display panel according to a user's demand.

To this end, an embodiment of the present invention provides a touch structure, which comprises a plurality of first electrodes and a plurality of second electrodes arranged to intersect with and insulate from the plurality of first electrodes. The first electrodes and the second electrodes are connected with respective signal transmission lines which transmits a touch signal to the corresponding first electrode or second electrode. At least one electrode in a set of the first electrodes and the second electrodes is a closable electrode, and at least a part of the closable electrode is a closable part. A switch unit is arranged between the closable part and the corresponding signal transmission line to control connection and disconnection between the closeable part and the corresponding signal transmission line.

In an embodiment of the present invention, one closeable electrode corresponds to one signal transmission line and one switch unit, and the whole closeable electrode is the closeable part. An endpoint of the closeable electrode is electrically connected to the signal transmission line through the switch unit, and the other endpoint of the closeable electrode is suspended. The signal transmission lines are arranged in an edge region of the touch structure.

In an embodiment of the present invention, one closable electrode corresponds to two signal transmission lines and two switch units. Each closeable electrode includes a first sub-electrode and a second sub-electrode, and both of the first sub-electrode and the second sub-electrode are the closeable parts. An endpoint of the first sub-electrode is electrically connected to one signal transmission line through one switch unit, and the other endpoint of the first sub-electrode is suspended. An endpoint of the second sub-electrode is suspended, and the other endpoint of the second sub-electrode is electrically connected to the other signal transmission line through the other switch unit. The signal transmission lines are arranged in an edge region of the touch structure.

In an embodiment of the present invention, one closable electrode corresponds to one signal transmission line and one switch unit. Each closeable electrode includes a first sub-electrode and a second sub-electrode, and the second sub-electrode is the closeable part. An endpoint of the first sub-electrode is connected to the signal transmission line, and the other endpoint of the first sub-electrode is electrically connected to an endpoint of the second sub-electrode through the switch unit, and the other endpoint of the second sub-electrode is suspended. And the signal transmission lines are arranged in an edge region of the touch structure.

In an embodiment of the present invention, the touch structure further comprises control units, which are connected to the switch units and arranged to control ON/OFF states of the switch units.

In an embodiment of the present invention, the switch unit comprises a thin film transistor. A first electrode of the thin film transistor is connected with the closeable part, a second electrode of the thin film transistor is electrically connected with the corresponding signal transmission line, and a control electrode of the thin film transistor is connected with the control unit.

In an embodiment of the present invention, the control unit comprises a control signal generation subunit and a single-channel switch subunit. A fixed endpoint of the single-channel switch subunit is connected with the control electrode of the thin film transistor and a channel endpoint of the single-channel switch subunit is connected with the control signal generation subunit. The control signal generation subunit is arranged to generate a control signal, which turns on the thin film transistor.

In an embodiment of the present invention, the control unit comprises a first signal generation subunit, a second signal generation subunit and a double-channel switch subunit. A fixed endpoint of the double-channel switch subunit is connected with the control electrode of the thin film transistor, and two channel endpoints of the double-channel switch subunit are connected with the first signal generation subunit and the second signal generation subunit, respectively. The first signal generation subunit is arranged to generate a first signal and the second signal generation subunit is arranged to generate a second signal. The thin film transistor is turned on upon the control electrode of the thin film transistor receives the first signal, and the thin film transistor is turned off upon the control electrode of the thin film transistor receives the second signal.

In an embodiment of the present invention, at least one synchronization control area is reserved in the touch structure in advance, and the synchronization control area includes a plurality of the closeable parts. The switch units corresponding to the closeable parts in the same synchronization control area are controlled by the same control unit.

Another embodiment of the present invention further provides a touch display panel, comprising an aforesaid touch structure.

Another embodiment of the present invention further provides a touch display device comprising an aforesaid touch display panel.

The embodiments of the present invention have the following advantages. The embodiments of the present invention provide a touch structure, a touch display panel and a touch display device. The touch structure comprises a plurality of first electrodes and a plurality of second electrodes arranged to intersect with the plurality of first electrodes.

The first electrodes and the second electrodes are connected with the respective signal transmission lines which transmit the touch signal to the corresponding first electrode or second electrode. At least one first electrode and/or at least one second electrode can be a closeable electrode, and at least a part of the closeable electrode is a closable part. The switch unit is arranged between the closable part and the corresponding signal transmission line to control connection and disconnection between the closeable part and the corresponding signal transmission line. With the present invention, by arranging the switch unit between the closeable part and the corresponding signal transmission line to control the connection and disconnection between the closeable part and the corresponding signal transmission line, the touch function in the region corresponding to the closeable part can be enabled or disabled.

DETAILED DESCRIPTION

In order to make those skilled in the art better understand the technical solution of the present invention, the embodiments of the touch structure, touch display panel and touch display device will be described in detail in combination with the figures.

Figure 1:
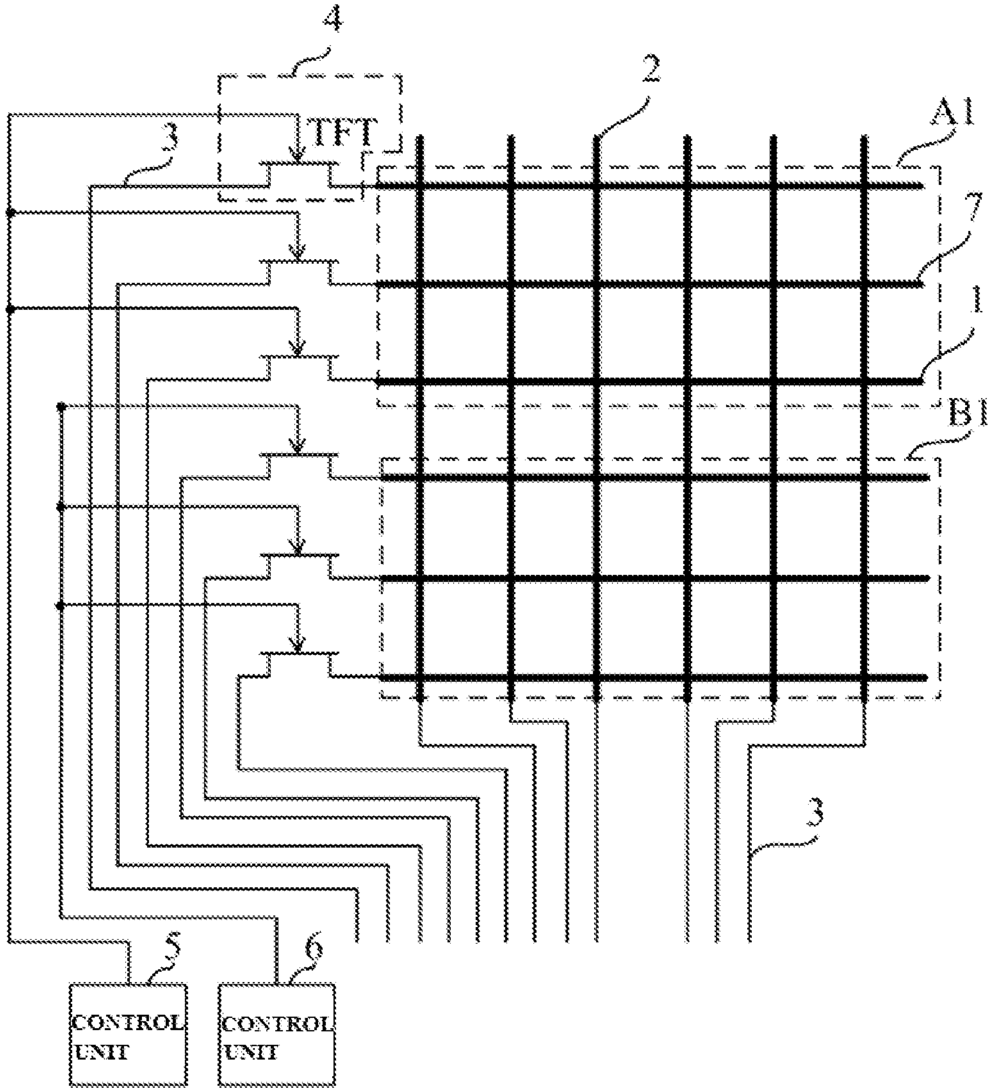
FIG. 1 is a structural schematic diagram illustrating the touch structure according to a first embodiment of the present invention.

FIG. 1 is a structural schematic diagram illustrating the touch structure according to a first embodiment of the present invention. As shown in FIG. 1, the touch structure comprises a plurality of first electrodes 1 and a plurality of second electrodes 2 arranged to intersect with and insulative from the plurality of first electrodes 1. Each first electrode 1 is connected with the corresponding signal transmission line 3 and each second electrode 2 is connected with the corresponding signal transmission line 3. All the signal transmission lines 3 are arranged in the edge region of the touch structure. The signal transmission line 3 may transmit the touch signal to the corresponding first electrode 1 or second electrode. In FIG. 1, each first electrode 1 is the closeable electrode 7, and the whole electrode 7 is the closeable part (i.e., the entirety of the closeable electrode 7 is regarded as the closeable part). The switch unit 4 is arranged between the closable part and the corresponding signal transmission line 3 to control the connection and disconnection between the closeable part and the corresponding signal transmission line 3.

Specifically, in FIG. 1, one closeable electrode 7 may correspond to one signal transmission line 3 and one switch unit 4. An endpoint of the closeable electrode 7 is electrically connected to the signal transmission line 3 through the switch unit 4, and the other endpoint of the closeable electrode 7 is suspended.

It should be noted that in the embodiments of the present invention, one of the first electrode 1 and the second electrode 2 may be a touch scan electrode, and the other may be a touch sensing electrode. In order to facilitate the understanding of the embodiments of the present invention for those skilled in the art, assume that the first electrode 1 is the touch scan electrode and the second electrode 2 is the touch sensing electrode in the following description, which does not limit the technical solution of the present invention. In addition, the first electrode 1 arranged horizontally and the second electrode 2 arranged vertically in FIG. 1 are only exemplary.

In the case that the first electrode 1 is the touch scan electrode and the second electrode 2 is the touch sensing electrode, the signal transmission line 3 corresponding to the first electrode 1 transmits the touch scan signal to the first electrode 1, and the signal transmission line 3 corresponding to the second electrode 2 transmits the touch sensing signal generated by the second electrode 2 to an external detection unit (not shown in the Figure).

Next the principle of the present invention will be described in detail as follows in combination with the figures.

See FIG. 1, when the switch unit 4 is in ON state, the closeable part (the first electrode 1) and the signal transmission line 3 are connected with each other through the switch unit 4, and the signal transmission line 3 transmits the touch scan signal to the closeable part through the switch unit 4. At this time, if a user touches the region corresponding to the closeable part, a touch sensing signal is generated in the second electrode 2 corresponding to the position of the touch point. The second electrode 2 transmits the touch sensing signal to the external detection unit through the corresponding signal transmission line 3, such that the position of the touch point can be calculated, i.e., the touch function in the region corresponding to the closeable part is enabled.

When the switch unit 4 is in OFF state, the closeable part (the first electrode 1) and the signal transmission line 3 are disconnected, and the signal transmission line 3 cannot transmit the touch scan signal to the closeable part. At this time, even if the user touches the region corresponding to the closeable part, the touch sensing signal cannot be generated in the second electrode 2 corresponding to the position of the touch point, so the external detection unit cannot obtain the touch sensing signal and thus the position of the touch point cannot be calculated, i.e., the touch function in the region corresponding to the closeable part is disabled.

It can be seen from the above description that, with the embodiment of the present invention, the enablement or disablement of the touch function in the region corresponding to the closeable part connected with the switch unit 4 can be controlled by turning the switch unit 4 ON or OFF.

It should be noted, it is just illustrative that all the first electrodes 1 in FIG. 1 are the closeable electrodes 7, which would not limit the present invention. In the embodiment, some of the first electrodes 1 can be selected as the closeable electrodes 7 in accordance with a user's demand.

In addition, in the embodiment, not only the first electrode 1 but also the second electrode 2 may be the closeable electrode 7. The case where the second electrode 2 is the closeable electrode will be described in detail as follows in combination with the figures.

Figure 2:
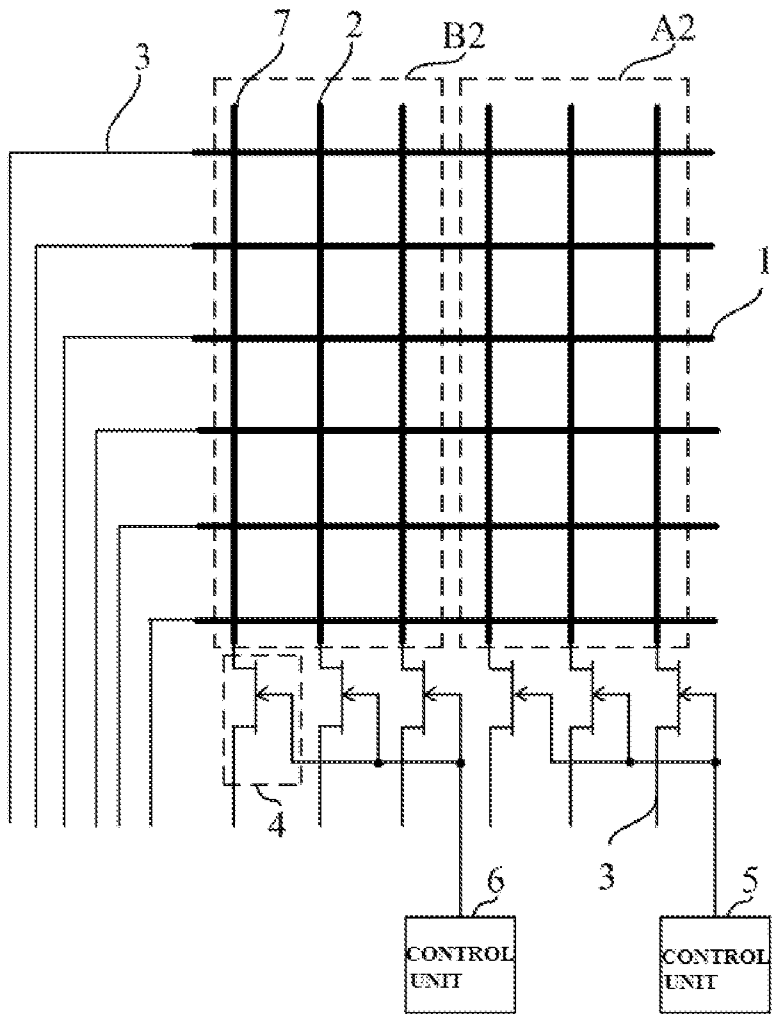
FIG. 2 is a schematic diagram illustrating a variant of the touch structure according to the first embodiment of the present invention.

FIG. 2 is a schematic diagram illustrating a variant of the touch structure according to the first embodiment of the present invention. As shown in FIG. 2, each second electrode 2 may be the closeable electrode 7, and the whole electrode 7 is the closeable part (i.e., the entirety of the closeable electrode 7 is the closeable part). The switch unit 4 is arranged between the closable part and the corresponding signal transmission line 3 to control the connection and disconnection between the closeable part and the corresponding signal transmission line 3.

As the first electrode 1 is directly connected with the signal transmission line 3, the touch scan signal can be directly transmitted to the first electrode 1. At this time, if the user touches the region corresponding to the closeable part, the touch sensing signal will be generated in the closeable part corresponding to the position of the touch point.

When the switch unit 4 is in ON state, the closeable part (the second electrode 2) and the signal transmission line 3 are connected with each other through the switch unit 4. The closeable part can transmit the touch sensing signal to the external detection unit through the corresponding signal transmission line 3, i.e., the touch function in the region corresponding to the closeable part can be enabled.

When the switch unit 4 is in OFF state, the closeable part (the second electrode 2) and the signal transmission line 3 are disconnected. The closeable part does not transmit the touch sensing signal to the external detection unit through the corresponding signal transmission line 3. The external detection unit cannot obtain the touch sensing signal, and thus the position of the touch point cannot be calculated, i.e., the touch function in the region corresponding to the closeable part is disabled.

It should be noted, it is just illustrative that all the second electrodes 2 in FIG. 2 are the closeable electrodes 7, which will not limit the present invention. In the embodiment, the number of the second electrodes 2 as the closeable electrodes 7 may be arbitrary value.

In addition, those skilled in the art will appreciate that when the closeable electrodes are selected from a set of all the first electrodes and all the second electrodes, a certain number of the second electrodes 2 may be selected as the closeable electrodes 7 while a certain number of the first electrodes 1 are selected as the closeable electrodes 7, and such a case will not be described in detail.

With the embodiment of the present invention, by arranging the switch unit 4 between the closeable part and the corresponding signal transmission line 3 to control the connection and disconnection between the closeable part and the corresponding signal transmission line 3, the touch function in the region corresponding to the closeable electrode 7 can be enabled or disabled.

Returning to FIG. 1, the touch structure may further comprise control units 5, 6, which are connected with the switch units 4. The control units 5, 6 may control the ON/OFF state of the switch units 4. In practice, the user may operate the control unit to turn on or turn off the switch unit 4, so as to control the enablement or disablement of the touch function in the region corresponding to the closeable part connected with the switch unit 4.

Further, the switch unit 4 may comprise a thin film transistor TFT. A first electrode of the thin film transistor TFT is connected with the closeable part, a second electrode of the thin film transistor TFT is electrically connected with the corresponding signal transmission line 3, and a control electrode of the thin film transistor TFT is connected with the control unit.

Figure 3:
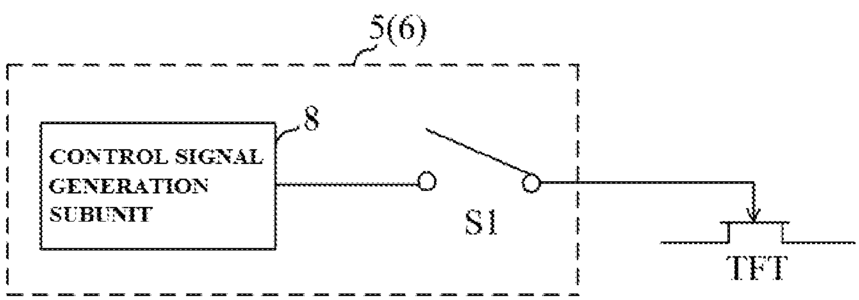
FIG. 3 is a structural schematic diagram illustrating the control unit in the embodiments of the present invention.

FIG. 3 is a structural schematic diagram illustrating the control unit in the embodiments of the present invention. As shown in FIG. 3, each of the control units 5, 6 comprises a control signal generation subunit 8 and a single-channel switch subunit. A fixed endpoint of the single-channel switch subunit S1 is connected with the control electrode of the thin film transistor TFT and a channel endpoint of the single-channel switch subunit S1 is connected with the control signal generation subunit 8. The control signal generation subunit 8 may generate a control signal. Upon the control signal is received at the control electrode of the thin film transistor TFT, the thin film transistor TFT is turned on. The user may operate the single-channel switch subunit S1 to control whether to output the control signal to the control electrode of the thin film transistor TFT. In the embodiment, the single-channel switch subunit S1 can be arranged on a frame of the touch display device as a physical button or arranged on the touch display panel as a touch key.

Further, the thin film transistor TFT may be an N-type thin film transistor, and thus the control signal generation subunit 8 is a high level generator for generating high level signals. The thin film transistor TFT may also be a P-type thin film transistor, and thus the control signal generation subunit 8 is a low level generator for generating low level signals.

Figure 4:
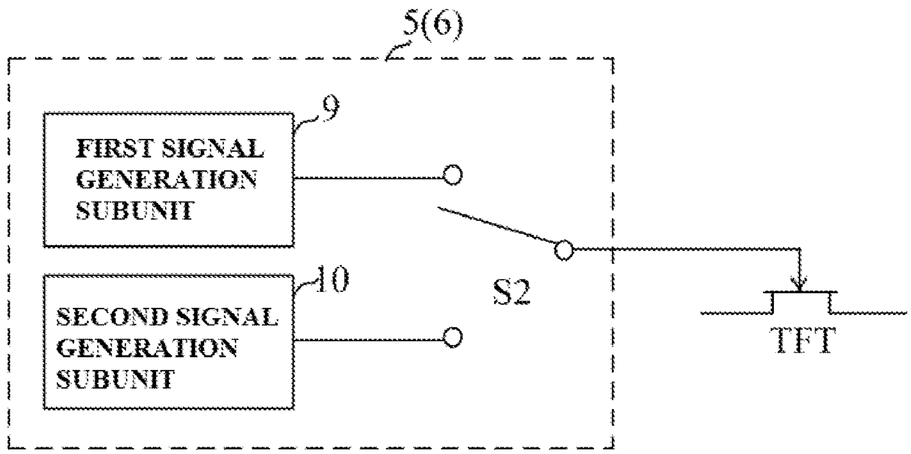
FIG. 4 is a structural schematic diagram illustrating another control unit in the embodiments of the present invention.

FIG. 4 is structural schematic diagram illustrating another control unit in the embodiments of the present invention. As shown in FIG. 4, each of the control units 5, 6 comprises a first signal generation subunit 9, a second signal generation subunit 10 and a double-channel switch subunit S2. A fixed endpoint of the double-channel switch subunit S2 is connected with the control electrode of the thin film transistor TFT, two channel endpoints of the double-channel switch subunit S2 are connected with the first signal generation subunit 9 and the second signal generation subunit 10, respectively. The first signal generation subunit 9 may generate a first signal, and the second signal generation subunit 10 may generate a second signal. Upon the first signal is received at the control electrode of the thin film transistor TFT, the thin film transistor TFT is turned on. Upon the second signal is received at the control electrode of the thin film transistor TFT, the thin film transistor TFT is turned off. The user may operate the double-channel switch subunit S2 so as to output the first signal or the second signal to the control electrode of the thin film transistor TFT. In the embodiment, the double-channel switch subunit S2 can be arranged on the frame of the touch display device as a physical button, or arranged on the touch panel as a touch key.

Further, the thin film transistor TFT may be an N-type thin film transistor, and thus the first signal generation subunit is a high level generator and the second signal generation subunit is a low level generator. The first signal is a high level signal, and the second signal is a low level signal. The thin film transistor TFT may also be a P-type thin film transistor, and thus the first signal generation subunit is a low level generator, and the second signal generation subunit is a high level generator. The first signal is a low level signal, and the second signal is a high level signal.

Alternatively, at least one synchronization control area may be reserved in the touch structure in advance. A plurality of closeable parts may be included in the synchronization control area. The switch units 4 corresponding to all the closeable parts in the same synchronization control area may be controlled by the same control unit. In practice, the user may expect that the region where the touch function is to be disabled is the region with large area (which is much larger than the region corresponding to one closeable part). If the switch units 4 corresponding to all the closeable parts in the region are turned off one by one, the user may need to operate a plurality of the control units, which causes inconvenience to the user. To solve the above-mentioned problem, with the embodiment of the present invention, a plurality of synchronization control areas are reserved in the touch panel in advance in accordance with the user's demand, and the switch units 4, which correspond to all the closeable parts in the same synchronization control area, correspond to the same control unit. Thus the user only needs to operate one control unit to control the synchronization of the switch units 4 corresponding to all the closeable parts (the whole closeable electrode 7) in the synchronization control area, i.e., achieving "one-key control" of the enablement or disablement of the touch functions in the synchronization control area.

For example, in FIG. 1 two synchronization control areas A1 and B1 are reserved in the touch structure in advance. The gates of the thin film transistors TFT corresponding to all the closeable parts in the synchronization control area A1 at the upper side are all connected with one control unit 5, and the gates of the thin film transistors TFT corresponding to all the closeable parts in the synchronization control area B1 at the lower side are all connected with another control unit 6. The user may operate the control unit 5 to control the enablement or disablement of the touch function in the synchronization control area A1 at the upper side, and may operate the control unit 6 to control enablement or disablement of the touch function in the synchronization control area B1 at the lower side.

In FIG. 2, for another example, two synchronization control areas A2 and B2 are reserved in the touch structure in advance. The gates of the thin film transistors corresponding to all the closeable parts in the synchronization control area A2 at the right side are all connected with one control unit 5, and the gates of the thin film transistors corresponding to all the closeable parts in the synchronization control area B2 at the left side are all connected with another control unit 6. The user may operate the control unit 5 to control enablement or disablement of the touch function in the synchronization control area A2 at the right side, and may operate the control unit 6 to control enablement or disablement of the touch function in the synchronization control area B2 at the left side.

However, in the touch structure shown in FIG. 1, when the user expects to disable the touch function in a certain region of the touch display panel, the touch function will be disabled in rows, so that the region where the touch function is actually disabled in the touch display panel is much larger than the region to be disabled expected by the user. For example, the user expects to disable the touch function in the left side region of the touch display panel only, but the touch function in the right side region of the touch display panel will be disabled as well.

Figure 5:
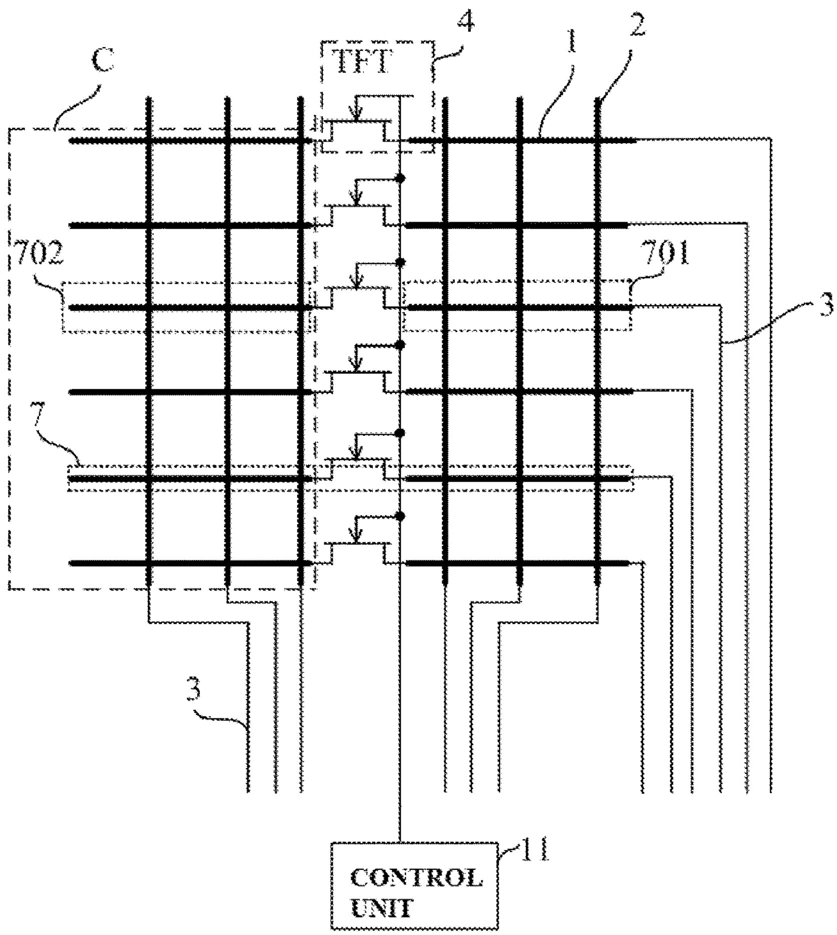
FIG. 5 is a structural schematic diagram illustrating the touch structure according to a second embodiment of the present invention.

To solve the above-mentioned problem, the second embodiment of the present invention provides another touch structure. FIG. 5 is a structural schematic diagram illustrating the touch structure according to the second embodiment of the present invention. As shown in FIG. 5, similar to FIG. 1, one closeable electrode 7 in FIG. 5 still corresponds to one signal transmission line 3 and one switch unit 4, and all the signal transmission lines 3 are arranged in the edge region of the touch structure. Different from FIG. 1, a part of the closeable electrode 7 is the closeable part. Specifically, each closeable electrode 7 is divided into a first sub-electrode 701 and a second sub-electrode 702 in advance, and only the second sub-electrode 702 is the closeable part. Furthermore, an endpoint of the first sub-electrode 701 is connected with the signal transmission line 3, and the other endpoint of the first sub-electrode 701 is connected with an endpoint of the second sub-electrode 702 through the switch unit 4, and the other endpoint of the second sub-electrode 702 is suspended.

To be consistent with the touch structure as shown in FIG. 1, the embodiment will be described assuming that the first electrode 1 is the closeable electrode 7.

When the switch unit 4 is in ON state, the first sub-electrode 701 is electrically connected with the closeable part (the second sub-electrode 702), i.e., the closeable part is electrically connected with the corresponding signal transmission line 3, and the touch scan signal may be transmitted to the closeable part. At this time, if the user touches the region corresponding to the closeable part, the touch sensing signal is generated in the second electrode 2 corresponding to the position of the touch point. The second electrode 2 transmits the touch sensing signal to the external detection unit through the corresponding signal transmission line 3, so that the detection unit can calculate the position of the touch point, i.e., the touch function in the region corresponding to the closeable part is enabled.

When the switch unit 4 is in OFF state, the first sub-electrode 701 is disconnected with the closeable part, i.e., the closeable part is disconnected with the corresponding signal transmission line 3. At this time, the touch scan signal cannot be transmitted to the closeable part over the signal transmission line 3. At this time, even if the user touches the region corresponding to the closeable part, the touch sensing signal will not be generated in the second electrode 2 corresponding to the position of the touch point. The external detection unit cannot obtain the touch sensing signal and thus the position of the touch point cannot be calculated, i.e., the touch function in the region corresponding to the closeable part is disabled.

Based on the above-mentioned principle, all the second sub-electrodes 702 may be prearranged at the left side of the touch display panel, and all the first sub-electrodes 701 may be prearranged at the right side of the touch display panel. In this case, when the user expects to disable the touch function in the left side region of the touch display panel, the touch function in the left side region of the touch display panel can be disabled, and the touch function in the right side region of the touch display panel will not be disabled.

It should be noted that the length of the first sub-electrode 701 and the length of the second sub-electrode 702 may be set in accordance with the user's demands in the embodiment.

Those skilled in the art will appreciate that this embodiment may also be applied to the case in which the second electrode 2 is the closeable electrode 7, so as to solve the technical problem that the touch functions in the touch structure shown in FIG. 2 can only be disabled in columns, and the specific process will not be described in detail here.

In addition, the touch structure in the embodiment may also include the control unit 11 as described in the first embodiment. The control unit 11 has been described in the first embodiment, and its detailed description will be omitted here. Indeed, like the first embodiment, at least one synchronization control area may be reserved in the touch structure in advance in the embodiment (FIG. 5 shows only one synchronization control area C is reserved), and the switch units 4, which correspond to all the closeable parts (the second sub-electrodes 702) in the same synchronization control area C, correspond to the same control unit 11, so as to achieve "one-key control" of the enablement or disablement of the touch functions in the synchronization control area C.

With the touch structure shown in FIG. 5, although the region where the touch function is actually disabled in the touch display panel approximates to the region where the touch function is expected to be disabled by the user, when the region where the touch function is expected to be disabled by the user corresponds to the region where the first sub-electrode 701 is located, the touch function in the region where the touch function is expected to be disabled cannot be disabled.

Figure 6:
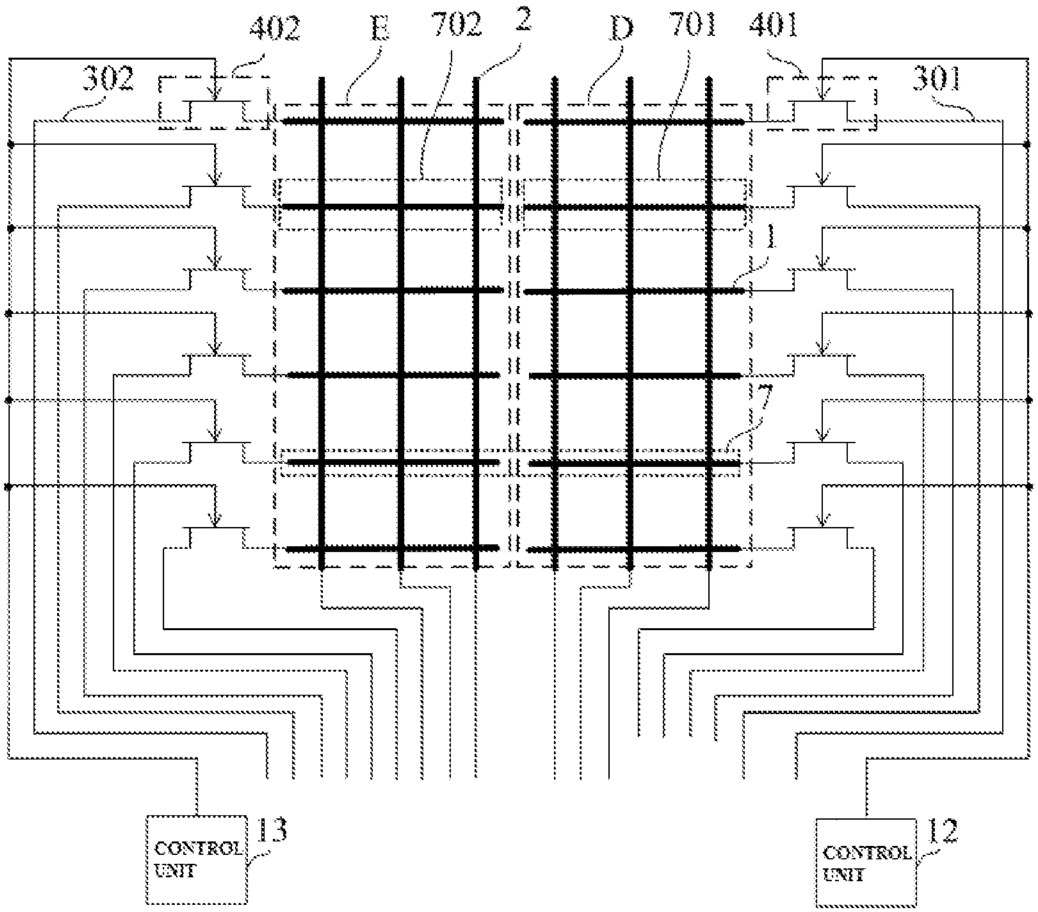
FIG. 6 is a structural schematic diagram illustrating the touch structure according to a third embodiment of the present invention.

To solve the above-mentioned problem, the third embodiment of the present invention provides another touch structure. FIG. 6 is a structural schematic diagram illustrating the touch structure according to the third embodiment of the present invention. As shown in FIG. 6, assume that the first electrode 1 is the closeable electrode 7. Similar to FIG. 5, each closeable electrode 7 in FIG. 6 is divided into a first sub-electrode 701 and a second sub-electrode 702 in advance. Different from FIG. 5, one closeable electrode 7 in FIG. 6 corresponds to two signal transmission lines 301, 302 and two switch units 401, 402, and both of the first sub-electrode 701 and the second sub-electrode 702 are the closeable parts. Specifically, an endpoint of the first sub-electrode 701 is electrically connected with the signal transmission line 301 through the switch unit 401, and the other endpoint of the first sub-electrode 701 is suspended. An endpoint of the second sub-electrode 702 is suspended, and the other endpoint of the second sub-electrode 702 is electrically connected with the signal transmission line 302 through the switch unit 402.

In the embodiment, the closeable electrode 7 may be divided into a first sub-electrode 701 and a second sub-electrode 702. The first sub-electrode 701 corresponds to the signal transmission line 301 and the switch unit 401, and the second sub-electrode 702 corresponds to the signal transmission line 302 and the switch unit 402, so that both the first sub-electrode 701 and the second sub-electrode 702 are the closeable parts. The principle of using the switch unit 401 to control the enablement or disablement of the touch function in the region corresponding to the first sub-electrode 701 and the principle of using the switch unit 402 to control enablement or disablement of the touch function in the region corresponding to the second sub-electrode 702 may be similar to the principle of using the switch unit 4 to control the enablement or disablement of the touch function in the region corresponding to the whole closeable electrode 7 in the first embodiment.

It should be noted that the length of the first sub-electrode 701 and the length of the second sub-electrode 702 may be set in accordance with the user's demand. In addition, those skilled in the art will appreciate that this embodiment may also be applied to the case in which the second electrode 2 is the closeable electrode 7.

In addition, the touch structure in the embodiment may also include the control units 12, 13, as described in the first embodiment. The control units 12, 13 have been described in the first embodiment, and their detailed description will be properly omitted here. Indeed, in the embodiment, like the first embodiment, at least one synchronization control area may be reserved in advance in the touch structure (FIG. 6 shows two synchronization control areas D and E are reserved), and the switch units 401, which correspond to all the closeable parts (the first sub-electrodes 701) in the synchronization control area D, correspond to the same control unit 12, and the switch units 402, which correspond to all the closeable parts (the second sub-electrodes 702) in the synchronization control area E, correspond to the same control unit 13, so as to achieve "one-key control" of the enablement or disablement of the touch functions in the synchronization control areas.

The fourth embodiment of the present invention provides a touch display panel. The touch display panel comprises the touch structure and the display panel (including a liquid crystal case and polarizers attached to both sides of the liquid crystal case). The touch structure may be the touch structure according to any one of the first, second, and third embodiments, and may be a resistance touch structure or a capacitance touch structure.

In addition, in the embodiments of the present invention, the touch structure may be integrated with the display panel in different ways. For example, the touch structure may be integrated with the display panel in One Glass Solution (OGS) way. In this case, the first electrode and the second electrode in the touch structure are both arranged on the polarizer at the side of the color film substrate. The touch structure may also be integrated with the display panel in On-cell way. In this case, the first electrode and the second electrode in the touch structure are both arranged between the color film substrate and the polarizer attached to the side of the color film substrate. The touch structure may also be integrated with the display panel in In-cell way. In this case, the first electrode and the second electrode in the touch structure are both arranged inside the liquid crystal case.

The fifth embodiment of the present invention provides a touch display device, which comprises the touch display panel as described above.

It should be understood that the above described embodiments are only illustrative of the principle of the present invention, but the present invention is not limited to this. Without departing from spirit and essence of the present invention, those skilled in the art may make various modifications and improvements to the present invention, which should be also deemed to fall within the protection scope claimed by the present invention.

What is claimed is:

1. A touch structure comprising a plurality of first electrodes, a plurality of second electrodes arranged to intersect with and insulate from the plurality of first electrodes, a plurality of switch units enclosed by the plurality of first electrodes and the plurality of second electrodes, and at least one control unit, wherein the plurality of first electrodes and the plurality of second electrodes are connected with respective signal transmission lines which transmit a touch signal to the corresponding plurality of first electrodes or plurality of second electrodes, wherein at least one electrode in a set of the plurality of first electrodes and the plurality of second electrodes is a closeable electrode, at least a part of the closeable electrode is a closeable part, wherein one switch unit of the plurality of switch units is arranged between the closeable part and the corresponding signal transmission line to control connection and disconnection between the closeable part and the corresponding signal transmission line, wherein the closeable electrode corresponds to one of the signal transmission lines and said one switch unit, wherein the closeable electrode includes a first sub-electrode arranged at one side of the touch structure and intersecting with at least one electrode of the plurality of first electrodes or the plurality of second electrodes, and a second sub-electrode arranged at another side of the touch structure and intersecting with at least another electrode of the plurality of first electrodes or the plurality of second electrodes, wherein the second sub-electrode is the closeable part, wherein an endpoint of the first sub-electrode is directly connected to said one signal transmission line and the other endpoint of the first sub-electrode is electrically connected to an endpoint of the second sub-electrode through said one switch unit, wherein the endpoint of the second sub-electrode is electrically connected to said one signal transmission line through the first sub-electrode and said one switch unit, wherein the other endpoint of the second sub-electrode is suspended, wherein the signal transmission lines are arranged in an edge region of the touch structure, wherein the control unit is connected to said one switch unit, and arranged to control a state of said one switch unit based on an operation of a user about whether to enable a touch function in a region corresponding to the closeable part, wherein in response to said one switch unit being in an ON state, the touch function in the region corresponding to the closeable part is enabled, and wherein in response to said one switch unit being in an OFF state, the touch function in the region corresponding to the closeable part is disabled.

2. The touch structure according to claim 1 wherein said one switch unit comprises a thin film transistor, and wherein a first electrode of the thin film transistor is connected with the closeable part, a second electrode of the thin film transistor is electrically connected with the corresponding signal transmission line, and a control electrode of the thin film transistor is connected with the control unit.

3. The touch structure according to claim 2 wherein the control unit comprises a control signal generation subunit and a single-channel switch subunit, wherein a fixed endpoint of the single-channel switch subunit is connected with the control electrode of the thin film transistor and a channel endpoint of the single-channel switch subunit is connected with the control signal generation subunit; and wherein the control signal generation subunit is arranged to generate a control signal which turns on the thin film transistor.

4. The touch structure according to claim 2 wherein the control unit comprises a first signal generation subunit, a second signal generation subunit and a double-channel switch subunit, wherein a fixed endpoint of the double-channel switch subunit is connected with the control electrode of the thin film transistor, and two channel endpoints of the double-channel switch subunit are connected with the first signal generation subunit and the second signal generation subunit, respectively; and wherein the first signal generation subunit is arranged to generate a first signal and the second signal generation subunit is arranged to generate a second signal, wherein the thin film transistor is turned on upon the control electrode of the thin film transistor receiving the first signal, and the thin film transistor is turned off upon the control electrode of the thin film transistor receiving the second signal.

5. The touch structure according to claim 1 further comprising at least one synchronization control area having a plurality of closeable parts, wherein the plurality of closeable parts includes said closeable part, wherein the plurality of switch units correspond to the plurality of closeable parts in the same synchronization control area, wherein the touch structure includes a plurality of control units, and wherein the plurality of switch units are controlled by one of the control units.

6. The touch structure according to claim 1:

wherein the plurality of first electrodes are touch scan electrodes, and the plurality of second electrodes are touch sensing electrodes; or wherein the plurality of first electrodes are touch sensing electrodes, and the plurality of second electrodes are touch scan electrodes.

7. A touch display panel comprising the touch structure according to claim 1.

8. A touch display device comprising the touch display panel according to claim 7.

9. A touch structure comprising a plurality of first electrodes, a plurality of second electrodes arranged to intersect with and insulate from the plurality of first electrodes, and a plurality of switch units enclosed by the plurality of first electrodes and the plurality of second electrodes, the plurality of first electrodes and the plurality of second electrodes connected with respective signal transmission lines for transmitting a touch signal to the corresponding plurality of first electrodes or plurality of second electrodes, wherein at least one electrode in a set of the plurality of first electrodes and the plurality of second electrodes is a closeable electrode, wherein at least a part of the closeable electrode is a closeable part, wherein one switch unit of the plurality of switch units is arranged between the closeable part and the corresponding signal transmission line to control connection and disconnection between the closeable part and the corresponding signal transmission line, wherein the closeable electrode includes a first sub-electrode arranged at one side of the touch structure and intersecting with at least one electrode of the plurality of first electrodes or the plurality of second electrodes, and a second sub-electrode arranged at another side of the touch structure and intersecting with at least another electrode of the plurality of first electrodes or the plurality of second electrodes, wherein an endpoint of the first sub-electrode is directly connected to said one signal transmission line and the other endpoint of the first sub-electrode is electrically connected to an endpoint of the second sub-electrode through said one switch unit, wherein the endpoint of the second sub-electrode is electrically connected to said one signal transmission line through the first sub-electrode and said one switch unit, wherein the other endpoint of the second sub-electrode is suspended.

10. The touch structure according to claim 9 further comprising at least one control unit, wherein said one switch unit comprises a thin film transistor, and wherein a first electrode of the thin film transistor is connected with the closeable part, a second electrode of the thin film transistor is electrically connected with the corresponding signal transmission line, and a control electrode of the thin film transistor is connected with the at least one control unit.

11. The touch structure according to claim 10 wherein the at least one control unit comprises a control signal generation subunit and a single-channel switch subunit, wherein a fixed endpoint of the single-channel switch subunit is connected with the control electrode of the thin film transistor and a channel endpoint of the single-channel switch subunit is connected with the control signal generation subunit; and wherein the control signal generation subunit is arranged to generate a control signal which turns on the thin film transistor.

12. The touch structure according to claim 10 wherein the at least one control unit comprises a first signal generation subunit, a second signal generation subunit and a double-channel switch subunit, wherein a fixed endpoint of the double-channel switch subunit is connected with the control electrode of the thin film transistor, and two channel endpoints of the double-channel switch subunit are connected with the first signal generation subunit and the second signal generation subunit, respectively; and wherein the first signal generation subunit is arranged to generate a first signal and the second signal generation subunit is arranged to generate a second signal, wherein the thin film transistor is turned on upon the control electrode of the thin film transistor receiving the first signal, and the thin film transistor is turned off upon the control electrode of the thin film transistor receiving the second signal.

13. The touch structure according to claim 9 further comprising at least one synchronization control area having a plurality of closeable parts, wherein the plurality of closeable parts includes said closeable part, wherein the plurality of switch units correspond to the plurality of closeable parts in the same synchronization control area, wherein the touch structure includes a plurality of control units, and wherein the plurality of switch units are controlled by one of the control units.

14. The touch structure according to claim 9:

wherein the plurality of first electrodes are touch scan electrodes, and the plurality of second electrodes are touch sensing electrodes; or wherein the plurality of first electrodes are touch sensing electrodes, and the plurality of second electrodes are touch scan electrodes.

15. A touch display panel comprising the touch structure according to claim 9.

16. A touch display device comprising the touch display panel according to claim 15.

* * * * *